United States Patent
Zhao et al.

(10) Patent No.: US 12,437,404 B1
(45) Date of Patent: Oct. 7, 2025

(54) MACHINE VISION-BASED METHOD FOR RAPIDLY DETECTING SCAR CONTOUR

(71) Applicant: QILU HOSPITAL OF SHANDONG UNIVERSITY (QINGDAO), Qingdao (CN)

(72) Inventors: Haiguang Zhao, Qingdao (CN); Ziqi Wang, Qingdao (CN)

(73) Assignee: QILU HOSPITAL OF SHANDONG UNIVERSITY, (QINGDAO) Qingdao (CN)

( * ) Notice: Subject to any disclaimer, the term of this patent is extended or adjusted under 35 U.S.C. 154(b) by 0 days.

(21) Appl. No.: 19/171,987

(22) Filed: Apr. 7, 2025

(30) Foreign Application Priority Data

Apr. 8, 2024 (CN) .......................... 202410410564.6

(51) Int. Cl.
  *G06T 7/00* (2017.01)
  *G06T 7/11* (2017.01)
  *G06T 7/12* (2017.01)

(52) U.S. Cl.
  CPC .. *G06T 7/0012* (2013.01); *G06T 2207/30088* (2013.01)

(58) Field of Classification Search
  CPC ................... G06T 7/0012; G06T 2207/30088
  See application file for complete search history.

(56) References Cited

U.S. PATENT DOCUMENTS

| | | | | |
|---|---|---|---|---|
| 9,007,480 B2* | 4/2015 | Ciuc | .................... | G06V 40/171 348/222.1 |
| 2019/0130166 A1* | 5/2019 | Wang | .................... | G06V 40/19 |

(Continued)

FOREIGN PATENT DOCUMENTS

| | | |
|---|---|---|
| CN | 106056590 A | 10/2016 |
| CN | 106373126 A | 2/2017 |

(Continued)

OTHER PUBLICATIONS

P. Singh and V. Saxena, "Assessing the Scar Images to Check Medical Treatment Effectiveness," 2018 5th International Conference on Signal Processing and Integrated Networks (SPIN), Noida, India, 2018, pp. 624-629 (Year: 2018).*

(Continued)

*Primary Examiner* — Gandhi Thirugnanam
(74) *Attorney, Agent, or Firm* — Getech Law LLC; Jun Ye (57) ABSTRACT

The present disclosure relates to the technical field of image processing, in particular to a machine vision-based method for rapidly detecting a scar contour, including: collecting to-be-detected neck images of a number of persons; obtaining a scar color difference salient degree and a scar brightness difference salient degree of each superpixel block according to a distribution difference situation of L-channel values and a-channel values among different superpixel blocks; obtaining a contour similarity degree of each superpixel block according to a correlation influence situation between the scar brightness difference salient degree and the scar color difference salient degree of the superpixel block, and a b-channel value of each pixel point; and performing scar contour detection according to the contour similarity degree. The present disclosure improves accuracy of a scar detection result and improves efficiency of rapidly detecting the scar contour.

5 Claims, 3 Drawing Sheets

(56) References Cited

U.S. PATENT DOCUMENTS

2021/0004962 A1* 1/2021 Tsai .......................... G06T 7/11
2022/0208355 A1* 6/2022 Li ............................ G06T 7/174
2023/0177801 A1* 6/2023 Le ............................. G06T 7/11
                                                              382/181

FOREIGN PATENT DOCUMENTS

| CN | 107578035 | A |   | 1/2018 | |
|----|-----------|---|---|--------|---|
| CN | 109086777 | A |   | 12/2018 | |
| CN | 110211078 | A |   | 9/2019 | |
| CN | 113781402 | A |   | 12/2021 | |
| CN | 114998320 | A |   | 9/2022 | |
| CN | 116542973 | A | * | 8/2023 | |
| CN | 117173188 | A |   | 12/2023 | |
| CN | 118014991 | A | * | 5/2024 | |
| CN | 118628501 | A | * | 9/2024 | |
| CN | 118761943 | A | * | 10/2024 | |
| WO | WO-2013084233 | A1 | * | 6/2013 | ......... G06K 9/00281 |

OTHER PUBLICATIONS

CN 202410410564.6, First Office Action, mailed May 16, 2024, 13 pages. (with English translation).
CN 202410410564.6, Notice of Allowance, mailed May 27, 2024, 9 pages. (with English translation).
Wu Qinglong, et al. "Journal of Yunnan University Natural Science Edition", the 5th Issue, Sep. 10, 2018, 7 pages. (with English Abstract).
Wen Yahong, et al., "Chinese Excellent Master's Thesis Full Text Database Information Technology Collection", the 6th Issue, Jun. 15, 2019, 71 pages. (with English Abstract).
Cheng, et al., "Applied Donics and Biomechanics", the 2020th volume, 8 pages.

* cited by examiner

MACHINE VISION-BASED METHOD FOR RAPIDLY DETECTING SCAR CONTOUR

TECHNICAL FIELD

The present disclosure relates to the technical field of image processing, in particular to a machine vision-based method for rapidly detecting a scar contour.

BACKGROUND OF THE INVENTION

An existing method for detecting a scar usually utilizes a context-aware (CA) saliency detection algorithm to detect the scar, while the traditional context-aware (CA) saliency detection algorithm segments an image to acquire a number of superpixel blocks, thereby detecting saliencies of the different superpixel blocks. However, due to an irregular distribution of a surface structure of the scar, the scar may exist in a plurality of different superpixel blocks, so that partial regions of the scar cannot be detected, which reduces the accuracy of a scar detection result.

SUMMARY OF THE INVENTION

The present disclosure provides a machine vision-based method for rapidly detecting a scar contour to solve existing problems: due to an irregular distribution of a surface structure of a scar, in superpixel blocks acquired by a traditional context-aware (CA) saliency detection algorithm, the scar may exist in a plurality of different superpixel blocks, so that partial regions of the scar cannot be detected, which reduces the accuracy of a scar detection result.

The machine vision-based method for rapidly detecting the scar contour of the present disclosure adopts a following technical solution.

The following steps are included:
collecting to-be-detected neck images of a number of persons, wherein the to-be-detected neck images contain a plurality of superpixel blocks, each superpixel block contains a plurality of pixel points, and each pixel point corresponds to an L-channel value, an a-channel value, and a b-channel value under a Lab space;
obtaining a scar color difference salient degree and a scar brightness difference salient degree of each superpixel block according to a distribution difference situation of L-channel values and a-channel values among different superpixel blocks, wherein the scar color difference salient degree is used to describe a difference between a scar color in the superpixel block and an overall color in other superpixel blocks, and the scar brightness difference salient degree is used to describe a difference between a scar brightness in the superpixel block and an overall brightness in the other superpixel blocks;
obtaining a contour similarity degree of each superpixel block according to a correlation influence situation between the scar brightness difference salient degree and the scar color difference salient degree of the superpixel block, and the b-channel value of each pixel point; and performing scar contour detection according to the contour similarity degree.

Preferably, a specific method comprised in obtaining the scar color difference salient degree and the scar brightness difference salient degree of each superpixel block according to the distribution difference situation of the L-channel values and the a-channel values among the different superpixel blocks is as follows:

obtaining, for any to-be-detected neck image, a scar color difference salient factor of an i-th superpixel block according to an overall difference situation of a-channel values between the i-th superpixel block and other superpixel blocks, and a distribution law situation of a-channel values in the i-th superpixel block; acquiring scar color difference salient factors of all the superpixel blocks, linearly normalizing the scar color difference salient factors of all the superpixel blocks, and recording each normalized scar color difference salient factor as the scar color difference salient degree;

acquiring a number of high-brightness pixel points in an i1-th superpixel block according to L-channel values of all pixel points in the i1-th superpixel block;

recording a Euclidean distance between each high-brightness pixel point in the i1-th superpixel block and a center of gravity of the i1-th superpixel block as a reference brightness distance of each high-brightness pixel point; obtaining a scar brightness difference salient factor of the i1-th superpixel block according to a scar color difference salient degree of the i1-th superpixel block and a distribution situation of reference brightness distances of all the the high-brightness pixel points in the i1-th superpixel block; and acquiring scar brightness difference salient factors of all the superpixel blocks, linearly normalizing all the scar brightness difference salient factors, and recording each normalized scar brightness difference salient factor as the scar brightness difference salient degree.

Preferably, a specific method comprised in obtaining the scar color difference salient factor of the i-th superpixel block according to the overall difference situation of the a-channel values between the i-th superpixel block and the other superpixel blocks, and the distribution law situation of the a-channel values in the i-th superpixel block is as follows:

recording a mean of a-channel values of all pixel points in the i-th superpixel block as a first mean of the i-th superpixel block; recording a mean of a-channel values of all pixel points in an m-th superpixel block except the i-th superpixel block as a second mean of the m-th superpixel block except the i-th superpixel block; recording a difference between the first mean of the i-th superpixel block and the second mean of the m-th superpixel block except the i-th superpixel block as a first difference of the m-th superpixel block except the i-th superpixel block; recording a mean of first differences of all superpixel blocks except the i-th superpixel block as a third mean of the i-th superpixel block;

recording an inverse proportion value of a variance of the a-channel values of all the pixel points in the i-th superpixel block as a first inverse proportion value of the i-th superpixel block; and recording a product of the third mean of the i-th superpixel block and the first inverse proportion value of the i-th superpixel block as the scar color difference salient factor of the i-th superpixel block.

Preferably, a specific method comprised in acquiring a number of high-brightness pixel points in the i1-th superpixel block according to the L-channel values of all the pixel points in the i1-th superpixel block is as follows:

sorting all the pixel points in the i1-th superpixel block in an order of the L-channel values from large to small, and recording a sorted sequence as a brightness pixel sequence;

recording, for any two adjacent pixel points in the brightness pixel sequence, a first pixel point as a first reference pixel point, and a second pixel point as a second reference pixel point in the two pixel points, and recording an absolute value of a difference of L-channel values between the first reference pixel point and the second reference pixel point as a reference brightness difference value; recording a first reference pixel point corresponding to a maximum value of the reference brightness difference value as a brightness demarcation pixel point; and recording each pixel point before the brightness demarcation pixel point in the brightness pixel sequence as a high-brightness pixel point.

Preferably, a specific method comprised in obtaining the scar brightness difference salient factor of the i1-th superpixel block according to the scar color difference salient degree of the i1-th superpixel block and the distribution situation of the reference brightness distances of all the high-brightness pixel points in the i1-th superpixel block is as follows:

recording a difference between 1 and the scar color difference salient degree of the i1-th superpixel block as a second difference of the i1-th superpixel block; recording a product of a mean of the L-channel values of all the pixel points in the i1-th superpixel block and the second difference of the i1-th superpixel block as a first product of the i1-th superpixel block;

recording an inverse proportion value of a variance of the reference brightness distances of all the high-brightness pixel points in the i1-th superpixel block as a second inverse proportion value of the i1-th superpixel block; recording the scar color difference salient degree of the i1-th superpixel block and the second inverse proportion value of the i1-th superpixel block as a second product of the i1-th superpixel block; and recording a product of the first product of the i1-th superpixel block and the second product of the i1-th superpixel block as the scar brightness difference salient factor of the i1-th superpixel block.

Preferably, a specific method comprised in obtaining the contour similarity degree of each superpixel block according to the correlation influence situation between the scar brightness difference salient degree and the scar color difference salient degree of the superpixel block, and the b-channel value of each pixel point is as follows:

obtaining a scar color difference salient weight and a scar brightness difference salient weight of an i2-th superpixel block and an i3-th superpixel block according to a difference situation of scar brightness difference salient degrees and scar color difference salient degrees between the i2-th superpixel block and the i3-th superpixel block;

obtaining a regional chromaticity distance between the i2-th superpixel block and the i3-th superpixel block according to the scar color difference salient weight and the scar brightness difference salient weight of the i2-th superpixel block and the i3-th superpixel block, and the b-channel value of each pixel point;

obtaining a contour similarity factor of the i2-th superpixel block and the i3-th superpixel block according to the regional chromaticity distance between the i2-th superpixel block and the i3-th superpixel block; and acquiring a contour similarity factor of all any two adjacent superpixel blocks, linearly normalizing all contour similarity factors, and recording each normalized contour similarity factor as the contour similarity degree.

Preferably, a specific method comprised in obtaining the scar color difference salient weight and the scar brightness difference salient weight of the i2-th superpixel block and the i3-th superpixel block according to the difference situation of the scar brightness difference salient degrees and the scar color difference salient degrees between the i2-th superpixel block and the i3-th superpixel block is as follows:

recording an absolute value of a difference of the scar color difference salient degrees between the i2-th superpixel block and the i3-th superpixel block as a color difference salient difference value of the i2-th superpixel block and the i3-th superpixel block; recording a sum of 1 and the color difference salient difference value as the scar color difference salient weight of the i2-th superpixel block and the i3-th superpixel block;

recording an absolute value of a difference of the scar brightness difference salient degrees between the i2-th superpixel block and the i3-th superpixel block as a brightness difference salient difference value of the i2-th superpixel block and the i3-th superpixel block; and recording a sum of 1 and the brightness difference salient difference value as the scar brightness difference salient weight of the i2-th superpixel block and the i3-th superpixel block.

Preferably, a specific method comprised in obtaining the regional chromaticity distance between the i2-th superpixel block and the i3-th superpixel block according to the scar color difference salient weight and the scar brightness difference salient weight of the i2-th superpixel block and the i3-th superpixel block, and the b-channel value of each pixel point is as follows:

recording a square of a difference between a mean of L-channel values of all pixel points in the i2-th superpixel block and a mean of L-channel values of all pixel points in the i3-th superpixel block as a third difference of the i2-th superpixel block and the i3-th superpixel block; recording a product of the third difference and the scar brightness difference salient weight of the i2-th superpixel block and the i3-th superpixel block as a third product of the i2-th superpixel block and the i3-th superpixel block;

recording a square of a difference between a mean of a-channel values of all the pixel points in the i2-th superpixel block and a mean of a-channel values of all the pixel points in the i3-th superpixel block as a fourth difference of the i2-th superpixel block and the i3-th superpixel block; recording a product of the fourth difference and the scar color difference salient weight of the i2-th superpixel block and the i3-th superpixel block as a fourth product of the i2-th superpixel block and the i3-th superpixel block;

recording a square of a difference between a mean of b-channel values of all the pixel points in the i2-th superpixel block and a mean of b-channel values of all the pixel points in the i3-th superpixel block as a fifth difference of the i2-th superpixel block and the i3-th superpixel block;

recording a sum of the third product, the fourth product and the fifth difference as a first sum value of the i2-th superpixel block and the i3-th superpixel block; and recording an arithmetic square root of the first sum value as the regional chromaticity distance between the i2-th superpixel block and the i3-th superpixel block.

Preferably, a specific method comprised in obtaining the contour similarity factor of the i2-th superpixel block and the i3-th superpixel block according to the regional chromaticity distance between the i2-th superpixel block and the i3-th superpixel block is as follows:

recording an absolute value of a difference of the scar brightness difference salient weight and the scar color difference salient weight between the i2-th superpixel block and the i3-th superpixel block as a first absolute value of the i2-th superpixel block and the i3-th superpixel block; recording a sum of 1 and the first absolute value as an adjustment factor of the i2-th superpixel block and the i3-th superpixel block; recording a product of the adjustment factor and a Euclidean distance of centers of gravity between the i2-th superpixel block and the i3-th superpixel block as a fifth product of the i2-th superpixel block and the i3-th superpixel block; and recording a ratio of the fifth product to the regional chromaticity distance between the i2-th superpixel block and the i3-th superpixel block as the contour similarity factor of the i2-th superpixel block and the i3-th superpixel block.

Preferably, a specific method comprised in performing the scar contour detection according to the contour similarity degree is as follows:

presetting a contour similarity degree threshold T1, merging, if a contour similarity degree of the i2-th superpixel block and the i3-th superpixel block is less than T1, the i2-th superpixel block with the i3-th superpixel block until a contour similarity degree of all any two adjacent superpixel blocks is greater than or equal to T1, and acquiring all the superpixel blocks in the to-be-detected neck images; inputting all the superpixel blocks into a CA saliency detection algorithm to acquire a saliency map; and presetting a salient value threshold T2, recording a pixel point with a salient value greater than T2 in the saliency map as a scar pixel point, acquiring all scar pixel points, and recording an image region occupied by all the scar pixel points as a scar contour region.

Beneficial effects of the technical solution of the present disclosure are that the contour similarity degree of each superpixel block is obtained by analyzing the distribution difference situation and the correlation situation of the L-channel values and the a-channel values in terms of brightness and color respectively among the different superpixel blocks, so as to perform the scar contour detection according to the contour similarity degree; wherein the scar color difference salient degree and the scar brightness difference salient degree of the superpixel block are first obtained according to the distribution difference situation of the L-channel values and the a-channel values among different superpixel blocks, and are used to reflect the difference between the scar brightness in the superpixel block and the overall color and brightness in the other superpixel blocks, so that a superpixel block with a scar is easier to recognize; and then the contour similarity degree of the superpixel block is obtained according to the correlation influence situation between the scar brightness difference salient degree and the scar color difference salient degree of the superpixel block, and the b-channel value of each pixel point, and is used to reflect a probability that the superpixel block belongs to the same skin region as surrounding superpixel blocks. The present disclosure adaptively merges the superpixel blocks by combining the correlation influence situation of colors and brightnesses and the distribution difference situation among different superpixel blocks, thereby adaptively adjusting sizes of the superpixel blocks, so as to make the scar region acquired by detection more complete, improve the accuracy of the scar detection result, and improve the efficiency of rapidly detecting the scar contour.

BRIEF DESCRIPTION OF DRAWINGS

In order to explain technical solutions in embodiments of the present disclosure or the prior art more clearly, accompanying drawings that need to be used in descriptions of the embodiments or the prior art are briefly introduced below. Apparently, the accompanying drawings in the following descriptions are only some embodiments of the present disclosure, and for those of ordinary skill in the art, on the premise of no creative work, other accompanying drawings may further be obtained from these accompanying drawings.

DETAILED DESCRIPTION OF THE INVENTION

In order to further elaborate technical means and efficacy adopted by the present disclosure to achieve an intended inventive purpose, specific implementations, structures, features and their efficacy of a machine vision-based method for rapidly detecting a scar contour proposed according to the present disclosure are described in detail as follows in conjunction with accompanying drawings and better embodiments. In the following explanation, different "one embodiment" or "another embodiment" do not necessarily refer to the same embodiment. In addition, specific characteristics, structures or features in one or more embodiments may be combined in any suitable form.

Unless otherwise defined, all technical and scientific terms used herein have the same meanings as generally understood by those of skill in the art of the present disclosure.

A specific solution of the machine vision-based method for rapidly detecting the scar contour provided by the present disclosure is described in detail below in conjunction with the accompanying drawings.

Figure 1:
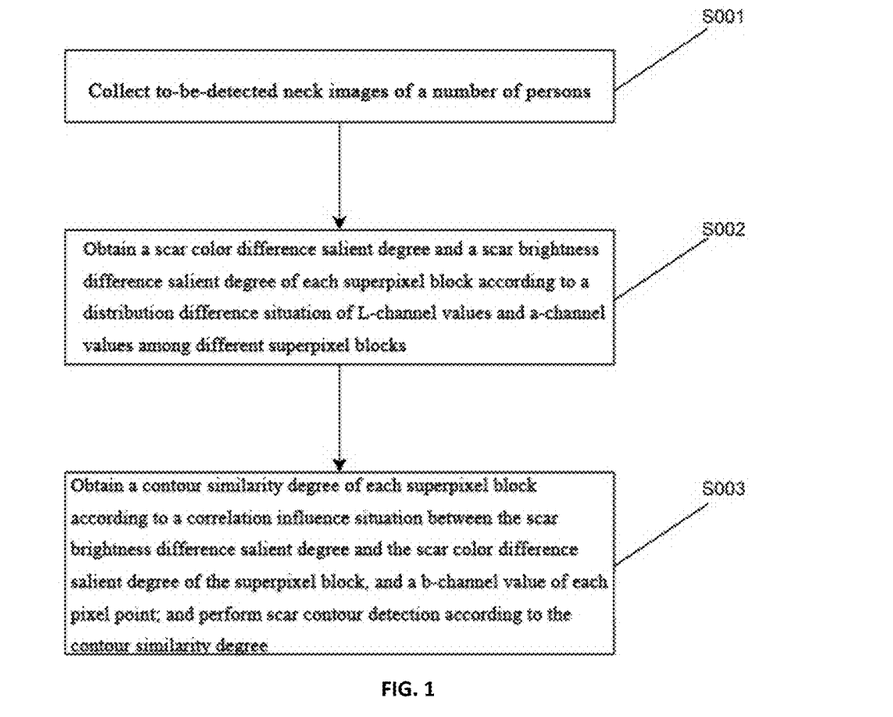
FIG. 1 is a flowchart of steps of a machine vision-based method for rapidly detecting a scar contour of the present disclosure.

Please refer to FIG. 1, which illustrates a flowchart of steps of a machine vision-based method for rapidly detecting a scar contour provided by an embodiment of the present disclosure. The method includes the following steps.

Step S001: to-be-detected neck images of a number of persons are collected.

It needs to be noted that a traditional context-aware (CA) saliency detection algorithm usually segments an image to acquire a number of superpixel blocks, thereby detecting saliencies of the different superpixel blocks. However, due to an irregular distribution of a surface structure of the scar, the scar may exist in a plurality of different superpixel blocks, so that partial regions of the scar cannot be detected, which reduces the accuracy of a scar detection result.

Figure 2:
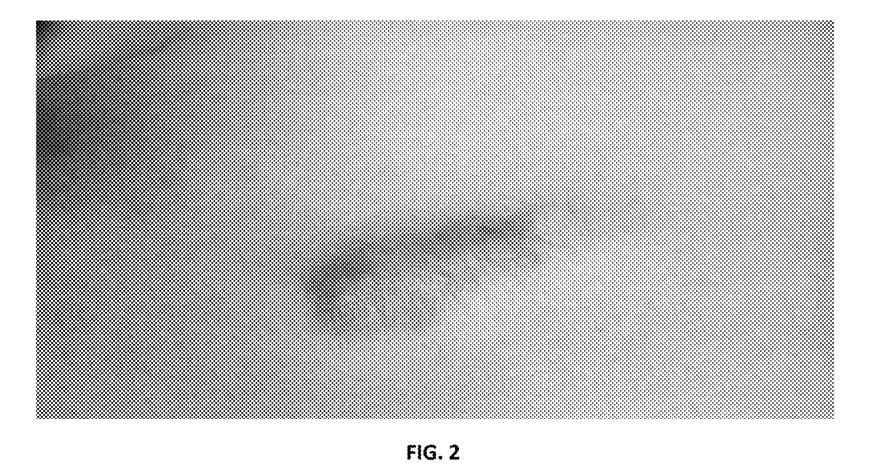
FIG. 2 is a schematic diagram of a grayscale image of a to-be-detected neck image of the present disclosure.

Specifically, the to-be-detected neck images need to be collected first, as shown in FIG. 2, which illustrates a schematic diagram of a grayscale image of a to-be-detected neck image. A specific process is as follows. An Antera 3D camera is used to vertically photograph neck regions of 50 experimenters to acquire a number of neck images. Lab color space conversion processing is performed on each neck image to acquire a number of neck images under a Lab space, and each neck image under the Lab space is recorded as the to-be-detected neck image. Each pixel point in each to-be-detected neck image corresponds to an L-channel value, an a-channel value, and a b-channel value. The L-channel value represents a numerical range of a brightness of the pixel point, and takes a value in a range [0,100]. The a-channel value represents a numerical range of the pixel point from green to red, and takes a value in a range [−128,127]. The b-channel value represents a numerical range of the pixel point from yellow to blue, and takes a value in a range [−128,127]. Lab color space conversion processing is a well-known technology and is not repeated in the present embodiment. It is also needs to be noted that the present embodiment does not limit the number of the experimenters and a photographing position, wherein the number of the experimenters and the photographing position may be determined according to a specific implementation situation.

At this point, all the to-be-detected neck images are obtained by the above method.

Step S002: a scar color difference salient degree and a scar brightness difference salient degree of each superpixel block are obtained according to a distribution difference situation of L-channel values and a-channel values among different superpixel blocks.

It needs to be noted that a scar contains more blood vessels and blood flow compared to a normal skin, so the scar tends to be more red compared to the normal skin, making an a-channel value of a pixel point corresponding to the scar relatively higher in the Lab space. At the same time, a distribution situation of the blood vessels inside the scar is more complex than a distribution situation of blood vessels under the normal skin, resulting in an irregular red distribution presented by the scar. In addition, unlike a surface of the normal skin, a surface of the scar does not have more obvious hairs and other factors to interfere with the color expression. In order to improve the accuracy of a scar detection result, the present embodiment obtains the scar color difference salient degree and the scar brightness difference salient degree of the superpixel block through the distribution situation of the a-channel value and the L-channel value in the superpixel block, so as to facilitate subsequent analysis and processing.

Specifically, taking any to-be-detected neck image as an example, a number of superpixel blocks in the to-be-detected neck image are acquired using a CA saliency detection algorithm. A scar color difference salient factor of an i-th superpixel block is obtained according to an overall difference situation of a-channel values between the i-th superpixel block and other superpixel blocks, and a distribution law situation of a-channel values in the i-th superpixel block. A process of acquiring a number of superpixel blocks in the image is well known in the CA saliency detection algorithm and is not repeated in the present embodiment.

Further, as an example, the scar color difference salient factor of the i-th superpixel block may be calculated by a following formula.

$$y_i = \left[\frac{1}{M_i} \times \sum_{m=1}^{M_i}(\overline{a1}_i - \overline{a1}_{i,m})\right] \times \exp(-\delta_i)$$

In the formula, $y_i$ represents the scar color difference salient factor of the i-th superpixel block. $M_i$ represents the number of all superpixel blocks except the i-th superpixel block. $\overline{a1}_i$ represents a mean of a-channel values of all pixel points in the i-th superpixel block. $\overline{a1}_{i,m}$ represents a mean of a-channel values of all pixel points in an m-th superpixel block other than the i-th superpixel block. $\delta_i$ represents a variance of the a-channel values of all the pixel points in the i-th superpixel block. exp( ) represents an exponential function with a natural constant as a base. The embodiment adopts an exp(−x) model to present an inverse proportion relationship. x is an input of the model. An implementer may select an inverse proportion function according to an actual situation. exp(−di) represents a degree to which the a-channel values in the i-th superpixel block are not influenced by the hairs on the surface of the skin. If the scar color difference salient factor of the i-th superpixel block is larger, it means that a color contained in the i-th superpixel block is closer to the red color, reflecting that a scar is more likely to be present in the i-th superpixel block. Scar color difference salient factors of all the superpixel blocks are acquired. The scar color difference salient factors of all the superpixel blocks are linearly normalized. Each normalized scar color difference salient factor is recorded as the scar color difference salient degree.

Further, all the pixel points in the i1-th superpixel block are sorted in an order of the L-channel values from large to small, and a sorted sequence is recorded as a brightness pixel sequence. Taking any two adjacent pixel points in the brightness pixel sequence as an example, a first pixel point is recorded as a first reference pixel point, and a second pixel point is recorded as a second reference pixel point in this two pixel points. An absolute value of a difference of L-channel values between the first reference pixel point and the second reference pixel point is recorded as a reference brightness difference value. All reference brightness difference values in the brightness pixel sequence are acquired. A maximum value of the reference brightness difference value is acquired. A first reference pixel point corresponding to the maximum value of the reference brightness difference value is recorded as a brightness demarcation pixel point. Each pixel point before the brightness demarcation pixel point in the brightness pixel sequence is recorded as a high-brightness pixel point. Each reference brightness difference value corresponds to one first reference pixel point and one second reference pixel point. Each superpixel block contains a plurality of high-brightness pixel points.

Further, a Euclidean distance between each high-brightness pixel point in the i1-th superpixel block and a center of gravity of the i1-th superpixel block is recorded as a reference brightness distance of each high-brightness pixel point. A scar brightness difference salient factor of the i1-th superpixel block is obtained according to a scar color difference salient degree of the i1-th superpixel block and a distribution situation of reference brightness distances of all the high-brightness pixel points in the i1-th superpixel block. As an example, the scar brightness difference salient factor of the i1-th superpixel block may be calculated by a following formula.

$$u_{i1} = [(1-Y_{i1}) \times \overline{L}_{i1}] \times [Y_{i1} \times \exp(-\delta 1_{i1})]$$

In the formula, $u_{i1}$ represents the scar brightness difference salient factor of the i1-th superpixel block. $Y_{i1}$ represents the scar color difference salient degree of the i1-th superpixel block. $\overline{L}_{i1}$ represents a mean of L-channel values of all pixel points in the i1-th superpixel block. $\delta 1_{i1}$ represents a variance of the reference brightness distances of all the high-brightness pixel points in the i1-th superpixel block. exp( ) represents an exponential function with a natural constant as a base. The embodiment adopts an exp(−x) model to present an inverse proportion relationship. x is an input of the model. The implementer may select an inverse proportion function according to an actual situation. If the scar brightness difference salient factor of the i1-th superpixel block is larger, it means that there are more high-brightness reflective regions in the i1-th superpixel block, reflecting a higher possibility of the presence of a scar in the i1-th superpixel block. Scar brightness difference salient factors of all the superpixel blocks are acquired. All the scar brightness difference salient factors are linearly normalized. Each normalized scar brightness difference salient factor is recorded as the scar brightness difference salient degree.

At this point, the scar color difference salient degrees and the scar brightness difference salient degrees of all the superpixel blocks are obtained by the above method.

Step S003: a contour similarity degree of each superpixel block is obtained according to a correlation influence situation between the scar brightness difference salient degree and the scar color difference salient degree of the superpixel block, and the b-channel value of each pixel point. Scar contour detection is performed according to the contour similarity degree.

It needs to be noted that after the scar color difference salient degrees and the scar brightness salient degrees of all the superpixel blocks are acquired, the present embodiment determines a corresponding channel contour reference weight by analyzing respective difference situations of the scar color difference salient degrees and the scar brightness salient degrees among different superpixel blocks. The size of the superpixel block is then adaptively adjusted according to the channel contour reference weight to facilitate subsequent scar contour detection.

Specifically, an absolute value of a difference of the scar color difference salient degrees between the i2-th superpixel block and the i3-th superpixel block is recorded as a color difference salient difference value of the i2-th superpixel block and the i3-th superpixel block. A sum of 1 and the color difference salient difference value is recorded as the scar color difference salient weight of the i2-th superpixel block and the i3-th superpixel block.

Further, an absolute value of a difference of the scar brightness difference salient degrees between the i2-th superpixel block and the i3-th superpixel block is recorded as a brightness difference salient difference value of the i2-th superpixel block and the i3-th superpixel block. A sum of 1 and the brightness difference salient difference value is recorded as the scar brightness difference salient weight of the i2-th superpixel block and the i3-th superpixel block.

Further, a regional chromaticity distance between the i2-th superpixel block and the i3-th superpixel block is obtained according to the scar color difference salient weight and the scar brightness difference salient weight of the i2-th superpixel block and the i3-th superpixel block. As an example, the regional chromaticity distance between the i2-th superpixel block and the i3-th superpixel block may be calculated by a following formula:

$$d_{i2,i3}=\sqrt{\mu 1_{i2,i3}\times(\overline{L}_{i2}-\overline{L}_{i3})^2+\mu 2_{i2,i3}\times(\overline{a}_{i2}-\overline{a}_{i3})^2+(\overline{b}_{i2}-\overline{b}_{i3})^2}$$

In the formula, $d_{i2,i3}$ represents the regional chromaticity distance between the i2-th superpixel block and the i3-th superpixel block. $\mu 1_{i2,i3}$ represents the scar brightness difference salient weight of the i2-th superpixel block and the i3-th superpixel block. $\overline{L}_{i2}$ represents a mean of L-channel values of all pixel points in the i2-th superpixel block. $\overline{L}_{i3}$ represents a mean of L-channel values of all pixel points in the i3-th superpixel block. $\mu 2_{i2,i3}$ represents the scar color difference salient weight of the i2-th superpixel block and the i3-th superpixel block. $\overline{a}_{i2}$ represents a mean of a-channel values of all the pixel points in the i2-th superpixel block. $\overline{a}_{i3}$ represents a mean of a-channel values of all the pixel points in the i3-th superpixel block. $\overline{b}_{i2}$ represents a mean of b-channel values of all the pixel points in the i2-th superpixel block. $\overline{b}_{i3}$ represents a mean of b-channel values of all the pixel points in the i3-th superpixel block. If the regional chromaticity distance between the i2-th superpixel block and the i3-th superpixel block is smaller, it means that scar distribution situations between the i2-th superpixel block and the i3-th superpixel block are more similar.

Further, a contour similarity factor of the i2-th superpixel block and the i3-th superpixel block is obtained according to the regional chromaticity distance between the i2-th superpixel block and the i3-th superpixel block. As an example, the contour similarity factor of the i2-th superpixel block and the i3-th superpixel block may be calculated by a following formula:

$$f_{i2,i3} = \frac{(1 + |\mu 1_{i2,i3} - \mu 2_{i2,i3}|) \times D_{i2,i3}}{d_{i2,i3} + \epsilon}$$

In the formula, $f_{i2,i3}$ represents the contour similarity factor of the i2-th superpixel block and the i3-th superpixel block. $d_{i2,i3}$ represents the regional chromaticity distance between the i2-th superpixel block and the i3-th superpixel block. $\mu 1_{i2,i3}$ represents the scar brightness difference salient weight of the i2-th superpixel block and the i3-th superpixel block. $\mu 2_{i2,i3}$ represents the scar color difference salient weight of the i2-th superpixel block and the i3-th superpixel block. $D_{i2,i3}$ represents a Euclidean distance of centers of gravity between the i2-th superpixel block and the i3-th superpixel block. E represents a preset hyper-parameter. In the present embodiment, $\epsilon=1$ is preset to prevent a denominator from being 0. $(1+|\mu 1_{i2,i3}-\mu 2_{i2,i3}|)$ represents an adjustment factor of the i2-th superpixel block and the i3-th superpixel block. ∥ represents to take an absolute value. If the contour similarity factor of the i2-th superpixel block and the i3-th superpixel block is larger, it means the more the i2-th superpixel block and the i3-th superpixel block belong to the same skin region. A contour similarity factor of all any two adjacent superpixel blocks is acquired. All contour similarity factors are linearly normalized. Each normalized contour similarity factor is recorded as the contour similarity degree.

Further, a contour similarity degree threshold T1 is preset. The present embodiment is described using T1=0.7 as an example. The present embodiment does not provide a specific limitation. T1 may be determined according to a specific implementation situation. If a contour similarity degree of the i2-th superpixel block and the i3-th superpixel block is less than T1, the i2-th superpixel block is merged with the i3-th superpixel block until the contour similarity degree of all any two adjacent superpixel blocks is greater than or equal to T1. All the superpixel blocks in the to-be-detected neck image are acquired. A saliency map is acquired using the CA saliency detection algorithm according to all the superpixel blocks. The saliency map contains a plurality of pixel points. Each pixel point corresponds to a salient value. In addition, the process of acquiring the saliency map according to the superpixel blocks is well known in the CA saliency detection algorithm and is not repeated in the present embodiment.

Figure 3:
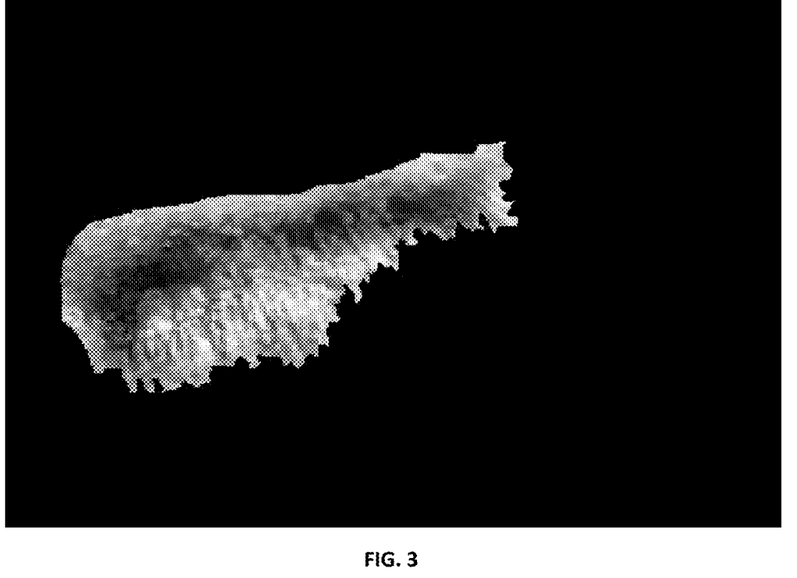
FIG. 3 is a schematic diagram of a scar contour region of the present disclosure.
Figure 4:
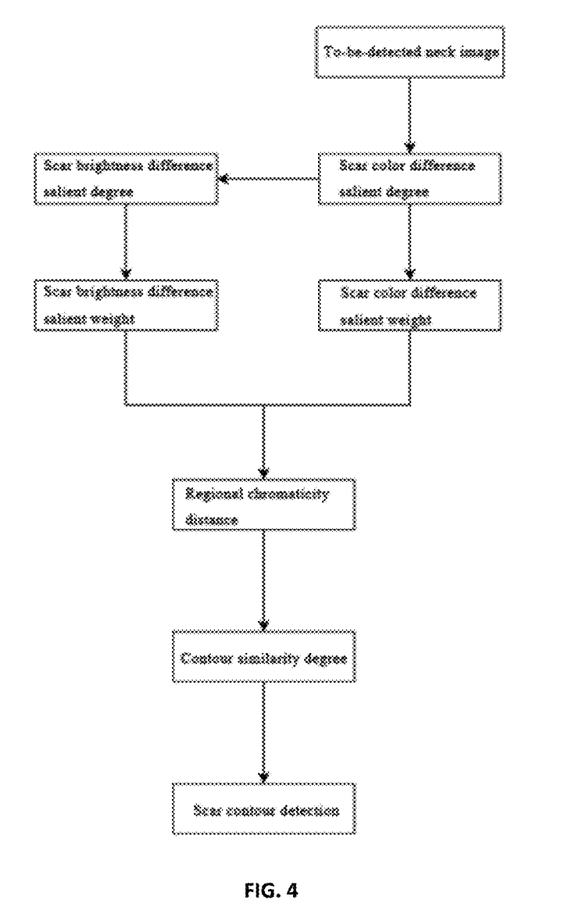
FIG. 4 is a flowchart of a feature relationship of a machine vision-based method for rapidly detecting a scar contour of the present disclosure.

Further, a salient value threshold T2 is preset. The present embodiment is described using T2=0.8 as an example. The present embodiment does not provide a specific limitation. T2 may be determined according to a specific implementation situation. A pixel point with a salient value greater than T2 in the saliency map is recorded as a scar pixel point. All scar pixel points are acquired. An image region occupied by all the scar pixel points is recorded as a scar contour region. Please refer to FIG. 3, which illustrates a schematic diagram of a scar contour region. Please refer to FIG. 4, which illustrates a flowchart of a feature relationship of a machine vision-based method for rapidly detecting a scar contour.

At this point, the present embodiment is completed.

The above is only better embodiments of the present disclosure and is not used to limit the present disclosure, and any modification, equivalent replacement, improvement, etc. made within the principle of the present disclosure should be included in the scope of protection of the present disclosure.

The invention claimed is:

1. A machine vision-based method for rapidly detecting a scar contour,
comprising the following steps:
collecting to-be-detected neck images of a number of persons, wherein the to-be-detected neck images contain a plurality of superpixel blocks, each superpixel block contains a plurality of pixel points, and each pixel point corresponds to an L-channel value, an a-channel value, and a b-channel value under a Lab space;
obtaining a scar color difference salient degree and a scar brightness difference salient degree of each superpixel block according to a distribution difference situation of L-channel values and a-channel values among different superpixel blocks, wherein the scar color difference salient degree is used to describe a difference between a scar color in the superpixel block and an overall color in other superpixel blocks, and the scar brightness difference salient degree is used to describe a difference between a scar brightness in the superpixel block and an overall brightness in the other superpixel blocks;
obtaining a contour similarity degree of each superpixel block according to a correlation influence situation between the scar brightness difference salient degree and the scar color difference salient degree of the superpixel block, and the b-channel value of each pixel point;
and performing scar contour detection according to the contour similarity degree;
wherein a specific method comprised in obtaining the contour similarity degree of each superpixel block according to the correlation influence situation between the scar brightness difference salient degree and the scar color difference salient degree of the superpixel block, and the b-channel value of each pixel point is as follows:
obtaining a scar color difference salient weight and a scar brightness difference salient weight of an i2-th superpixel block and an i3-th superpixel block according to a difference situation of scar brightness difference salient degrees and scar color difference salient degrees between the i2-th superpixel block and the i3-th superpixel block;
obtaining a regional chromaticity distance between the i2-th superpixel block and the i3-th superpixel block according to the scar color difference salient weight and the scar brightness difference salient weight of the i2-th superpixel block and the i3-th superpixel block, and the b-channel value of each pixel point;
obtaining a contour similarity factor of the i2-th superpixel block and the i3-th superpixel block according to the regional chromaticity distance between the i2-th superpixel block and the i3-th superpixel block; and
acquiring a contour similarity factor of all any two adjacent superpixel blocks, linearly normalizing all contour similarity factors, and recording each normalized contour similarity factor as the contour similarity degree;
wherein a specific method comprised in obtaining the scar color difference salient weight and the scar brightness difference salient weight of the i2-th superpixel block and the i3-th superpixel block according to the difference situation of the scar brightness difference salient degrees and the scar color difference salient degrees between the i2-th superpixel block and the i3-th superpixel block is as follows:
recording an absolute value of a difference of the scar color difference salient degrees between the i2-th superpixel block and the i3-th superpixel block as a color difference salient difference value of the i2-th superpixel block and the i3-th superpixel block; recording a sum of 1 and the color difference salient difference value as the scar color difference salient weight of the i2-th superpixel block and the i3-th superpixel block;
recording an absolute value of a difference of the scar brightness difference salient degrees between the i2-th superpixel block and the i3-th superpixel block as a brightness difference salient difference value of the i2-th superpixel block and the i3-th superpixel block; and
recording a sum of 1 and the brightness difference salient difference value as the scar brightness difference salient weight of the i2-th superpixel block and the i3-th superpixel block;
wherein a specific method comprised in obtaining the regional chromaticity distance between the i2-th superpixel block and the i3-th superpixel block according to the scar color difference salient weight and the scar brightness difference salient weight of the i2-th superpixel block and the i3-th superpixel block, and the b-channel value of each pixel point is as follows:
recording a square of a difference between a mean of L-channel values of all pixel points in the i2-th superpixel block and a mean of L-channel values of all pixel points in the i3-th superpixel block as a third difference of the i2-th superpixel block and the i3-th superpixel block: recording a product of the third difference and the scar brightness difference salient weight of the i2-th superpixel block and the i3-th superpixel block as a third product of the i2-th superpixel block and the i3-th superpixel block;
recording a square of a difference between a mean of a-channel values of all the pixel points in the i2-th superpixel block and a mean of a-channel values of all the pixel points in the i3-th superpixel block as a fourth difference of the i2-th superpixel block and the i3-th superpixel block: recording a product of the fourth difference and the scar color difference salient weight of the i2-th superpixel block and the i3-th superpixel block as a fourth product of the i2-th superpixel block and the i3-th superpixel block:

recording a square of a difference between a mean of b-channel values of all the pixel points in the i2-th superpixel block and a mean of b-channel values of all the pixel points in the i3-th superpixel block as a fifth difference of the i2-th superpixel block and the i3-th superpixel block;

recording a sum of the third product, the fourth product and the fifth difference as a first sum value of the i2-th superpixel block and the i3-th superpixel block; and recording an arithmetic square root of the first sum value as the regional chromaticity distance between the i2-th superpixel block and the i3-th superpixel block;

wherein a specific method comprised in obtaining the contour similarity factor of the i2-th superpixel block and the i3-th superpixel block according to the regional chromaticity distance between the i2-th superpixel block and the i3-th superpixel block is as follows:

recording an absolute value of a difference of the scar brightness difference salient weight and the scar color difference salient weight between the i2-th superpixel block and the i3-th superpixel block as a first absolute value of the i2-th superpixel block and the i3-th superpixel block; recording a sum of 1 and the first absolute value as an adjustment factor of the i2-th superpixel block and the i3-th superpixel block; recording a product of the adjustment factor and a Euclidean distance of centers of gravity between the i2-th superpixel block and the i3-th superpixel block as a fifth product of the i2-th superpixel block and the i3-th superpixel block; and recording a ratio of the fifth product to the regional chromaticity distance between the i2-th superpixel block and the i3-th superpixel block as the contour similarity factor of the i2-th superpixel block and the i3-th superpixel block;

wherein a specific method comprised in performing the scar contour detection according to the contour similarity degree is as follows:

presetting a contour similarity degree threshold T1, merging, if a contour similarity degree of an i2-th superpixel block and an i3-th superpixel block is less than T1, the i2-th superpixel block with the i3-th superpixel block until a contour similarity degree of all any two adjacent superpixel blocks is greater than or equal to T1, and acquiring all the superpixel blocks in the to-be-detected neck image; inputting all the superpixel blocks into a CA saliency detection algorithm to acquire a saliency map; and presetting a salient value threshold T2, recording a pixel point with a salient value greater than T2 in the saliency map as a scar pixel point, acquiring all scar pixel points, and recording an image region occupied by all the scar pixel points as a scar contour region.

2. The machine vision-based method for rapidly detecting the scar contour according to claim 1, wherein a specific method comprised in obtaining the scar color difference salient degree and the scar brightness difference salient degree of each superpixel block according to the distribution difference situation of the L-channel values and the a-channel values among the different superpixel blocks is as follows:

obtaining, for any to-be-detected neck image, a scar color difference salient factor of an i-th superpixel block according to an overall difference situation of a-channel values between the i-th superpixel block and other superpixel blocks, and a distribution law situation of a-channel values in the i-th superpixel block; acquiring scar color difference salient factors of all the superpixel blocks, linearly normalizing the scar color difference salient factors of all the superpixel blocks, and recording each normalized scar color difference salient factor as the scar color difference salient degree;

acquiring a number of high-brightness pixel points in an i1-th superpixel block according to L-channel values of all pixel points in the i1-th superpixel block;

recording a Euclidean distance between each high-brightness pixel point in the i1-th superpixel block and a center of gravity of the i1-th superpixel block as a reference brightness distance of each high-brightness pixel point; obtaining a scar brightness difference salient factor of the i1-th superpixel block according to a scar color difference salient degree of the i1-th superpixel block and a distribution situation of reference brightness distances of all the the high-brightness pixel points in the i1-th superpixel block; and acquiring scar brightness difference salient factors of all the superpixel blocks, linearly normalizing all the scar brightness difference salient factors, and recording each normalized scar brightness difference salient factor as the scar brightness difference salient degree.

3. The machine vision-based method for rapidly detecting the scar contour according to claim 2, wherein a specific method comprised in obtaining the scar color difference salient factor of the i-th superpixel block according to the overall difference situation of the a-channel values between the i-th superpixel block and the other superpixel blocks, and the distribution law situation of the a-channel values in the i-th superpixel block is as follows:

recording a mean of a-channel values of all pixel points in the i-th superpixel block as a first mean of the i-th superpixel block; recording a mean of a-channel values of all pixel points in an m-th superpixel block except the i-th superpixel block as a second mean of the m-th superpixel block except the i-th superpixel block; recording a difference between the first mean of the i-th superpixel block and the second mean of the m-th superpixel block except the i-th superpixel block as a first difference of the m-th superpixel block except the i-th superpixel block; recording a mean of first differences of all superpixel blocks except the i-th superpixel block as a third mean of the i-th superpixel block;

recording an inverse proportion value of a variance of the a-channel values of all the pixel points in the i-th superpixel block as a first inverse proportion value of the i-th superpixel block; and recording a product of the third mean of the i-th superpixel block and the first inverse proportion value of the i-th superpixel block as the scar color difference salient factor of the i-th superpixel block.

4. The machine vision-based method for rapidly detecting the scar contour according to claim 2, wherein a specific method comprised in acquiring a number of high-brightness pixel points in the i1-th superpixel block according to the L-channel values of all the pixel points in the i1-th superpixel block is as follows:

sorting all the pixel points in the i1-th superpixel block in an order of the L-channel values from large to small, and recording a sorted sequence as a brightness pixel sequence;

recording, for any two adjacent pixel points in the brightness pixel sequence, a first pixel point as a first reference pixel point, and a second pixel point as a second reference pixel point in the two pixel points, and recording an absolute value of a difference of L-channel values between the first reference pixel point and the second reference pixel point as a reference brightness difference value; recording a first reference pixel point corresponding to a maximum value of the reference brightness difference value as a brightness demarcation pixel point; and recording each pixel point before the brightness demarcation pixel point in the brightness pixel sequence as a high-brightness pixel point.

5. The machine vision-based method for rapidly detecting the scar contour according to claim 2, wherein a specific method comprised in obtaining the scar brightness difference salient factor of the i1-th superpixel block according to the scar color difference salient degree of the i1-th superpixel block and the distribution situation of the reference brightness distances of all the the high-brightness pixel points in the i1-th superpixel block is as follows:

recording a difference between 1 and the scar color difference salient degree of the i1-th superpixel block as a second difference of the i1-th superpixel block;

recording a product of a mean of the L-channel values of all the pixel points in the i1-th superpixel block and the second difference of the i1-th superpixel block as a first product of the i1-th superpixel block;

recording an inverse proportion value of a variance of the reference brightness distances of all the high-brightness pixel points in the i1-th superpixel block as a second inverse proportion value of the i1-th superpixel block;

recording a product of the scar color difference salient degree of the i1-th superpixel block and the second inverse proportion value of the i1-th superpixel block as a second product of the i1-th superpixel block; and recording a product of the first product of the i1-th superpixel block and the second product of the i1-th superpixel block as the scar brightness difference salient factor of the i1-th superpixel block.

* * * * *